United States Patent [19]

Woods et al.

[11] 3,764,625

[45] Oct. 9, 1973

[54] TRIFLUOROMETHYL-1,3-PHENYLENEDIAMINE COMPOUNDS

[75] Inventors: William G. Woods, Fullerton; Don L. Hunter, Anaheim; James D. Stone, Whittier; Cecil W. Le Fevre, Anaheim, all of Calif.

[73] Assignee: United States Borax & Chemical Corporation, Los Angeles, Calif.

[22] Filed: July 23, 1970

[21] Appl. No.: 57,787

Related U.S. Application Data

[62] Division of Ser. No. 812,357, April 1, 1969, Pat. No. 3,617,250.

[52] U.S. Cl. .......... 260/577, 260/570.5 P, 260/571, 260/573, 260/576
[51] Int. Cl. ..................... C07c 87/28, C07c 87/62
[58] Field of Search................... 260/573, 571, 576, 260/577

[56] References Cited
UNITED STATES PATENTS

| | | | |
|---|---|---|---|
| 3,466,329 | 9/1969 | Soper | 260/577 |
| 2,687,431 | 8/1954 | Marschall | 260/573 X |
| 3,549,303 | 12/1970 | Kalopissis et al. | 260/573 X |
| 3,591,638 | 7/1971 | Halasz | 260/577 X |
| 3,111,403 | 11/1963 | Soper | 260/577 X |
| 3,257,190 | 6/1966 | Soper | 260/577 X |
| 3,332,769 | 7/1967 | Soper | 260/577 X |
| 3,442,639 | 5/1969 | Soper | 260/577 X |
| 3,546,295 | 12/1970 | Maravetz | 260/577 |

FOREIGN PATENTS OR APPLICATIONS 1,110,819  4/1968  Great Britain ..................... 260/573

*Primary Examiner*—Lewis Gotts
*Assistant Examiner*—C. F. Warren
*Attorney*—James R. Thornton

[57] ABSTRACT

N,N'Substituted-1,3-phenylenediamine compounds having a trifluoromethyl and a nitro group on the aromatic ring. The compounds are useful as herbicides.

7 Claims, No Drawings

TRIFLUOROMETHYL-1,3-PHENYLENEDIAMINE COMPOUNDS

This application is a division of our co-pending application, Ser. No. 812,357 filed Apr. 1, 1969 and now U.S. Pat. No. 3,617,250.

This invention relates to novel trifluoromethyl-N-substituted phenylenediamine compounds and their use as herbicides. There is provided by this invention a class of N-substituted-1,3-phenylenediamine compounds having both a nitro and trifluoromethyl substituent on the aromatic ring which have outstanding herbicidal activity.

The novel compounds of this invention can be defined by the formula

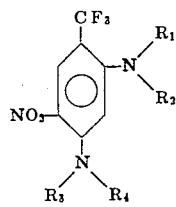

wherein $R_1$ and $R_3$ are each selected from hydrogen, alkyl, alkenyl, alkynyl, aralkyl, and aryl and $R_2$ and $R_4$ are each selected from alkyl, alkenyl, alkynyl, aralkyl, and aryl. Also, $R_1$-$R_2$ and/or $R_3$-$R_4$ can represent a portion of a cyclic group such as an alkylene chain to form a heterocyclic group containing carbon atoms and optionally other atoms, such as nitrogen, oxygen and sulfur, in addition to the nitrogen atom which is the point of attachment to the aromatic ring.

For convenience in naming the compounds, the amino nitrogen adjacent to the trifluoromethyl group is referred to as $N^1$. The amino nitrogen adjacent to the nitro group on the ring is referred to as $N^3$. Thus, the nitro substituent is in the 4-position of the aromatic ring and the trifluoromethyl group is in the 6-position of the aromatic ring. It will be noted from the above defintion that each amino nitrogen must have at least one substituent thereon, thereby excluding the unsubstituted amino ($NH_2$) groups.

Typical examples of the groups represented by $R_1$, $R_2$, $R_3$ and $R_4$ as defined above are the lower alkyl, lower alkenyl and lower alkynyl groups having up to about eight carbon atoms, including the cyclic analogues thereof as well as the halo, nitro, hydroxy and lower alkoxy substituted derivatives thereof. Representative groups are methyl, ethyl, n-propyl, isopropyl, n-butyl, sec-butyl, n-pentyl, n-hexyl, 2-ethylhexyl, n-octyl, allyl, 2-butenyl, 2-butynyl, 3-butynyl, crotyl, methylallyl, 2-pentynyl, 2-hydroxyethyl, 2-methoxyethyl, 3-ethoxypropyl, 2-chloroallyl, 2-bromoallyl, propargyl, 4-chloro-2-butenyl, 4-bromo-1-butenyl, 3-iodo2-pentenyl, 4-chloro-2-butynyl, 3-nitrobutyl, 2-nitroethyl, cyclo-hexyl, cyclopropyl, cyclobutyl, cyclohexenyl, and the like.

The substituents on the amino nitrogens according to this invention, can also be an aralkyl or aryl group and especially the monocyclic aralkyl and aryl groups such as benzyl, phenylethyl, phenyl, 2,4-dichlorophenyl, 3-bromophenyl, 4-methoxyphenyl, 3-chloro-4-methylphenyl, 4-nitrophenyl, 2,4-dimethylphenyl, 3-fluorophenyl, 4-chlorobenzyl, 2,4-dichlorobenzyl, and the like. Thus, the aralkyl and aryl groups can be unsubstituted or have nuclear substituents such as lower alkyl, lower alkoxy, halo and nitro.

Furthermore, $R_1$-$R_2$ and/or $R_3$-$R_4$ can represent a fragment of a ring of which the amino nitrogen is a part thereof, such as the piperidino, morpholino, thiomorpholino, piperazino, aziridinyl, and pyrrolidino rings. Such heterocyclic ring groups have the structure

in which Z is an alkylene, alkyleneoxy, alkyleneimino, or alkylenethio group having from about two to six carbon atoms in the chain.

A preferred class of compounds according to this invention are those in which $R_1$ and $R_3$ are each selected from hydrogen, alkyl of one to five carbon atoms including the halo-substituted derivatives thereof, and alkenyl of three to five carbon atoms including the halo-substituted derivatives thereof; and $R_2$ and $R_4$ are each selected from alkyl of one to five carbon atoms, including the halo substituted derivatives thereof, and alkenyl of three to five carbon atoms including the halo-substituted derivatives thereof. Thus, representative preferred examples of $R_1$, $R_2$, $R_3$ and $R_4$ are methyl, ethyl, n-propyl, isopropyl, n-butyl, sec-butyl, sec-pentyl, 2-chloroethyl, 5-bromopentyl, allyl, 2-butenyl, 2-chloroallyl, 2-iodoallyl, 3-bromo-2-pentenyl, 4-chloro-2-butenyl, and the like.

The most preferred compounds are those in which the $N^1$ and $N^3$ groups are different; that is, the two amino groups are unsymmetrically substituted. In this preferred class of compounds the total number of carbon atoms in the $N^1$ group is one to four and the total number of carbon atoms in the $N^3$ group is two to six.

Representative examples of this most preferred class of compounds are
$N^1$-allyl-$N^3$-ethyl-4-nitro-6-trifluoromethyl-1,3-phenylenediamine
$N^1$-ethyl-$N^3$,$N^3$-dimethyl-4-nitro-6-trifluoromethyl-1,3-phenylenediamine
$N^1$-ethyl-$N^3$,$N^3$-diethyl-4-nitro-6-trifluoromethyl-1,3-phenylenediamine
$N^1$,$N^1$-dimethyl-$N^3$-sec-butyl-4-nitro-6-trifluoromethyl-1,3-phenylenediamine
$N^1$,$N^1$-dimethyl-$N^3$,$N^3$-diethyl-4-nitro-6-trifluoromethyl-1,3-phenylenediamine
$N^1$-ethyl-$N^3$-(2-chloroallyl)-4-nitro-6-trifluoromethyl-1,3-phenylenediamine
$N^1$-methyl-$N^3$-sec-butyl-4-nitro-6-trifluoromethyl-1,3-phenylenediamine
$N^1$,$N^1$-diethyl-$N^3$-allyl-4-nitro-6-trifluoromethyl-1,3-phenylenediamine
$N^1$,$N^1$-diemthyl-$N^3$-isopropyl-4-nitro-6-trifluoromethyl-1,3-phenylenediamine
$N^1$-methyl-$N^3$,$N^3$-di-n-propyl-4-nitro-6-trifluoromethyl-1,3-phenylenediamine
$N^1$-methyl-$N^3$,$N^3$-diethyl-4-nitro-6-trifluoromethyl-1,3-phenylendiamine $N^1$-n-propyl-$N^3$,$N^3$-diethyl-4-nitro-6-trifluoromethyl-1,3-phenylenediamine The compounds of this invention are either crystalline solids or high bolding liquids. Generally, they are only slightly soluble in water and are moderately soluble in the usual organic solvents such as ethanol, acetone, ether and benzene. The compounds are readily prepared by reaction of one or two primary or secondary amines with a 2,4-dihalo-5-nitrobenzotrifluoride according to the following equation:

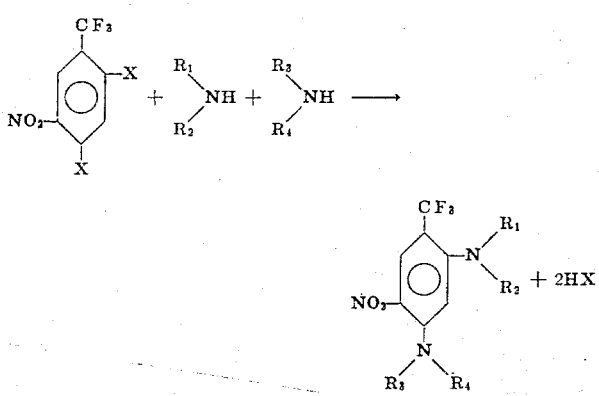

in which X is a reactive halogen such as chlorine or bromine and $R_1$, $R_2$, $R_3$ and $R_4$ can have the signigicance previously assigned.

When $R_1$ and $R_2$ are the same as $R_3$ and $R_4$, that is when the substituted $N^1$ amino group is the same as the substituted $N^3$ amino group in the resultant product, the reaction takes place in one step using an excess, that is, at least 4 moles of amine for each mole of 2,4-dihalo-5-nitrobenzotrifluoride. When $R_1$ and $R_2$ are different from $R_3$ and $R_4$, the reaction requires two steps in which a different amine is employed in each step. In the first step about 2 moles of the amine forming the $N^3$ group is reacted with about one mole of the 2,4-dihalo-5-nitrobenzotrifluoride. The first halogen atom replaced is that adjacent to the nitro substitutent on the aromatic ring. In the second step about 2 moles of the amine forming the $N^1$ group is reacted with the monoamino-substituted compound to form the unsymmetrically substituted phenylenediamine compound. The second reaction takes place preferably in a sealed reactiom vessel, such as a sealed tube or an autoclave, to avoid losses of amine and provide easy control of the reaction. In the case of higher boiling amines it is not necessary to use a sealed reaction vessel for the reaction but it is sufficient merely to heat the reaction mixture in the presence of a suitable solvent.

A reaction temperature of from about 50° to about 125° C. preferably is employed to give good yields of the desired product and a satisfactory rate of reaction, both in the case of using a sealed reaction vessel and when the reactants are heated in the presence of a solvent. Hydrogen halide is formed as a byproduct, and, in the presence of exceee amine, is converted to the amine hydrohalide which can be readily removed by washing with water or by filtration after dissolution of the product in a suitable solvent. The desired products can be purified by well known procedures such as by recrystallization or distillation under reduced pressure.

The intermediate 2,4-dihalo-5-nitrobenzotrifluorides can be prepared by nitration of the corresponding 2,4-dihalobenzotrifluoride such as described by French Pat. No. 745,293 (see Chem. Abstracts 27, 4414).

The following examples describe preparation of representative compounds of this invention but it is to be understood that the invention is not to be limited to the specific examples given.

EXAMPLE I $N^1,N^{N3}$-dimethyl-4-nitro-6-trifluoromethyl-1,3-phenylenediamine A heavy walled glass reaction tube of about 50 ml. capacity was charged with 5 grams of 2,4-dichloro-5-nitrobenzotrifluoride, 30 ml. of ethanol and 15 ml. of liquid methylamine. The reaction tube was sealed and heated in a bath at 100° C. for 184 hours. The cooled reaction tube was then opened and the contents evaporated to dryness to give a yellow-brown solid. To the solid was added 200 ml. of water to dissolve the methylamine hydrochloride and the water-insoluble product was separated therefrom by filtration. After washing the solid again with water, it was dissolved in 300 ml. of refluxing 95% ethanol. Upon cooling, the product crystallized and was isolated by filtration, obtaining 3.64 grams (67%) of the desired product as a yellow, crystalline solid, melting at 211°–212° C.

EXAMPLE II $N^1,N^3$-diethyl-4-nitro-6-trifluoromethyl-1,3-phenylenediamine

This compound was prepared in a similar manner by reaction of 2,4-dichloro-5-nitrobenzotrifluoride with ethylamine. The crystalline product was obtained as yellow plates melting at 115°–116.5° C.

EXAMPLE III $N^1,N^3$-bis(dimethyl)-4-nitro-6-trifluoromethyl-1,3-phenylenediamine This compound was prepared in a similar manner by reaction of 2,4-dichloro-5-nitrobenzotrifluoride with dimethylamine. The crystalline product melts at 83°–84° C.

EXAMPLES IV-XI

The following compounds were prepared in a similar manner by reaction of 2,4-dichloro-5-nitrobenzotrifluoride with the corresponding amine.

IV—$N^1,N^3$-di-n-propyl-4-nitro-6-trifluoromethyl-1,3-phenylenediamine; m.p. 63°–64° C.

V—$N^1,N^3$-diisopropyl-4-nitro-6-trifluoromethyl-1,3-phenylenediamine; m.p. 121.5°–123° C.

VI—$N^1,N^3$-dicyclopropyl-4-nitro-6-trifluoromethyl-1,3-phenylenediamine; m.p. 156°–157° C.

VII—$N^1,N^3$-diallyl-4-nitro-6-trifluoromethyl-1,3-phenylenediamine; m.p. 74°–74.5° C.

VIII—$N^1,N^3$-di-n-butyl-4-nitro-6-trifluoromethyl-1,3-phenylenediamine; m.p. 59°–59.5° C.

IX—$N^1,N^3$-di-sec-butyl-4-nitro-6-trifluoromethyl-1,3-phenylenediamine; b.p. 145°–146° C./0.15 mm.

X—$N^1,N^3$-dicyclohexyl-4-nitro-6-trifluoromethyl-1,3-Phenylendiamine; m.p. 136.5°–137.5° C.

XI—$N^1,N^3$-dibenzyl-4-nitro-6-trifluoromethyl-1,3-phenylenediamine; m.p. 120°–121° C.

EXAMPLE XII $N^1,N^3$-di(p-methoxyphenyl)-4-nitro-6-trifluoromethyl-1,3-phenylenediamine 2,4-Dichloro-5-nitrobenzotrifluoride was reacted with p-anisidine dissolved in 1,2-dimethoxyethane in a sealed tube at 150° C. for 75 hours to give the desired product melting at 191°–192° C., after recrystallization from ethanol.

EXAMPLE XIII

N,N-di-n-propyl-5-chloro-2-nitro-4-trifluoromethylaniline

A heavy walled glass reaction tube of approximately 100 ml. capacity was charged with 35.0 grams (0.1346 mole) of 2,4-dichloro-5-nitrobenzotrifluoride, 27.24 grams (0.2692 mole) of di-n-propylamine and 60 ml. of ethanol. The tube was sealed and heated in a bath at 100° C. for 4 days. The cooled reaction mixture was then evaporated to dryness to give a residue which was extracted with boiling diethyl ether. The insoluble di-n-propylamine hydrochloride was removed by filtration and washed with additional ether. The combined ether filtrates were evaporated to give a liquid residue which was distilled under reduced pressure to give 42 grams of the product as an orange liquid, b.p. 107°–118° C./0-.15 mm.; $n_D^{25}$ 1.5359.

$N^1$-ethyl-$N^3$,$N^3$-di-n-propyl-4-nitro-6-trifluoromethyl-1,3-phenylenediamine A glass reaction tube was charged with 0.013 mole of N,N-di-n-propyl-5-chloro-2-nitro-4-trifluoromethylaniline, 0.0536 mole of ethylamine and 20 ml. of ethanol. The tube was sealed and heated in a bath at 100° C. for 140 hours. The contents of the tube were cooled and the ethanol removed by evaporation. The residue was extracted with hot ether and the insoluble amine hydrochloride separated by filtration. The ether filtrate was evaporated to give an oily residue which was distilled under reduced pressure to give the desired product at 132°–134.5° C./0.1 mm.; $n_D^{25}$ 1.5636.

EXAMPLE XIV

N,N-diethyleneoxy-5-chloro-2-nitro-4-trifluoromethylaniline

A solution of 8 grams (0.0308 mole) of 2,4-dichloro-5-nitrobenzotrifluoride and 5.9 grams (0.0677 mole) of morpholine in 35 ml. of ethanol was refluxed for 18 hours. The solvent and excess morpholine were removed under reduced pressure to give a solid residue. The residue was extracted with water and the water-insoluble material recrystallized from aqueous ethanol to give 8.63 grams (70%) of product melting at 98°–99.5° C.

$N^1$-ethyl-$N^3$,$N^3$-diethyleneoxy-4-nitro-6-trifluoromethyl-1,3-phenylenediamine N,N-diethyleneoxy-5-chloro-2-nitro-4-trifluoromethylaniline was reacted with ethylamine in a sealed tube as described in Example XIII to give the desired product melting at 147°–149° C.

Representative examples of the many other compounds which can be prepared by the above general procedures are:

$N^1$-(2-hydroxyethyl)-$N^3$-sec-butyl-4-nitro-6-trifluoromethyl-1,3-phenylendiamine; m.p. 125°–126° C.

$N^1$-sec-butyl-$N^3$-methyl-4-nitro-6-trifluoromethyl-1,3-phenylenediamine; m.p. 76°–77° C.

$N^1$-sec-butyl-$N^3$-ethyl-4-nitro-6-trifluoromethyl-1,3-phenylenediamine; m.p. 52.5°–53.5° C.

$N^1$-methyl-$N^3$,$N^3$-di-n-butyl-4-nitro-6-trifluoromethyl-1,3-phenylenediamine; b.p. 148°–151° C./0.12 mm.

$N^1$-methyl-$N^3$,$N^3$-pentamethylene-4-nitro-6-trifluoromethyl-1,3-phenylenediamine; m.p. 93.5°–95° C.

$N^1$-ethyl-$N^3$,$N^3$-[diethylene-(N-methyl)imino]-4-nitro-6-trifluoromethyl-1,3-phenylenediamine; m.p. 113.5°–114.5° C.

$N^1$-ethyl-$N^3$-ethyl-$N^3$-n-butyl-4-nitro-6-trifluoromethyl-1,3-phenylenediamine; b.p. 140°–148° C./0.2 mm.

$N^1$,$N^1$-dimethyl-$N^3$,$N^3$-diisopropyl-4-nitro-6-trifluoromethyl-1,3-phenylenediamine; m.p. 92°–93° C.

$N^1$-ethyl-$N^3$-tert-butyl-4-nitro-6-trifluoromethyl-1,3-phenylenediamine; m.p. 149°–150° C.

$N^1$-n-propyl-$N^3$-allyl-4-nitro-6-trifluoromethyl-1,3-phenylenediamine; m.p. 70.5°–71.5° C.

$N^1$-ethyl-$N^3$-allyl-4-nitro-6-trifluoromethyl-1,3-phenylenediamine; m.p. 95.5°–96.5° C.

$N^1$-methyl-$N^3$,$N^3$-di-n-propyl-4-nitro-6-trifluoromethyl-1,3-phenylenediamine; m.p. 76.5°–77.5° C.

$N^1$-ethyl-$N^3$,$N^3$-dimethyl-4-nitro-6-trifluoromethyl-1,3-phenylenediamine; m.p. 100°–101° C.

$N^1$-allyl-$N^3$-ethyl-4-nitro-6-trifluoromethyl-1,3-phenylenediamine; m.p. 101°–102° C.

$N^1$-methyl-$N^3$-sec-butyl-4-nitro-6-trifluoromethyl-1,3-phenylenediamine; m.p. 95°–96° C.

$N^1$-methyl-$N^3$,$N^3$-diethyl-4-nitro-6-trifluoromethyl-1,3-phenylenediamine; m.p. 68°–69° C.

$N^1$-ethyl-$N^3$-(2-chloroallyl)-4-nitro-6-trifluoromethyl-1,3-phenylenediamine; m.p. 78°–81° C.

$N^1$-ethyl-$N^3$-(2-methoxyethyl)-4-nitro-6-trifluoromethyl-1,3-phenylenediamine; m.p. 129.5°–130.5° C.

$N^1$-ethyl-$N^3$-n-octyl-4-nitro-6-trifluoromethyl-1,3-phenylenediamine; m.p. 41°–42° C.

$N^1$-ethyl-$N^3$,$N^3$-di(2-methoxyethyl)-4-nitro-6-trifluoromethyl-1,3-phenylenediamine; b.p. 164.5°–165° C./0.35 mm.

$N^1$-ethyl-$N^3$-benzyl-4-nitro-6-trifluoromethyl-1,3-phenylenediamine; m.p. 97°–98° C.

$N^1$-n-propyl-$N^3$,$N^3$-diethyl-4-nitro-6-trifluoromethyl-1,3-phenylenediamine; b.p. 134°–138° C./0.15–0.20 mm.

$N^1$-ethyl-$N^3$-propargyl-4-nitro-6-trifluoromethyl-1,3-phenylenediamine; m.p. 160.5°–161.5° C.

$N^1$-methyl-$N^3$-ethyl-$N^3$-n-butyl-4-nitro-6-trifluoromethyl-1,3-phenylenediamine; b.p. 143°–157° C./0.18–0.20 mm.

$N^1$-ethyl-$N^3$-phenyl-4-nitro-6-trifluoromethyl-1,3-phenylenediamine; m.p. 94°–94.5° C.

$N^1$-ethyl-$N^3$,$N^3$-tetramethylene-4-nitro-6-trifluoromethyl-1,3-phenylenediamine; m.p. 130°–131° C.

$N^1$-sec-butyl-$N^3$,$N^3$-diethyl-4-nitro-6-trifluoromethyl-1,3-phenylenediamine; b.p. 130°–136° C./0.14–0.15 mm.

$N^1$-n-propyl-$N^3$-ethyl-4-nitro-6-trifluoromethyl-1,3-phenylenediamine; m.p. 80°–81° C.

$N^1$-n-propyl-$N^3$-isopropyl-4-nitro-6-trifluoromethyl-1,3-phenylenediamine; m.p. 73.5°–74.5° C.

$N^1$,$N^1$-dimethyl-$N^3$,$N^3$-di-n-propyl-4-nitro-6-trifluoromethyl-1,3-phenylenediamine; b.p. 127°–132° C./0.14 mm.

$N^1$,$N^1$-dimethyl-$N^3$,$N^3$-diethyl-4-nitro-6-trifluoromethyl-1,3-phenylenediamine; b.p. 114°–116° C./0.14–0.15 mm.

$N^1$-methyl-$N^3$-ethyl-4-nitro-6-trifluoromethyl-1,3-phenylenediamine; m.p. 151°–152° C.

$N^1$-ethyl-$N^3$-isopropyl-4-nitro-6-trifluoromethyl-1,3-phenylenediamine; m.p. 117.5°–119° C.

$N^1$,$N^1$-dimethyl-$N^3$-n-propyl-4-nitro-6-trifluoromethyl-1,3-phenylenediamine; m.p. 47°–48° C.

$N^1$-n-propyl-$N^3$,$N^3$-di-n-propyl-4-nitro-6-trifluoromethyl-1,3-phenylenediamine; b.p. 143°–151° C/0.18 mm.

$N^1$-allyl-$N^3$,$N^3$-diethyl-4-nitro-6-trifuloromethyl-1,3-phenylenediamine; b.p. 133°–135.5° C./0.15–0.18 mm.

$N^1$-sec-butyl-$N^3$,$N^3$-dimethyl-4-nitro-6-trifluoromethyl-1,3-phenylenediamine; b.p. 135° C./0.12 mm.

The compounds of this invention are excellent herbicides and are especially useful as selective herbicides for controlling weeds in the presence of desirable crops especially the grassy weeds such as, for example, foxtail, water grass, and crabgrass. Many of the compounds of this invention may be used in controlling weeds in desirable grassy crops such as corn and rice, as well as the small grains, and also the broad leaf crops such as cotton and soy beans. Also, many of the preferred compounds are effective in controlling wild oats which constitute a major problem in small grain crops such as wheat and barley. Their utility in controlling weeds in grassy crops such as corn, rice, and grains is surprising and unexpected in view of the phytotoxicity of many other aromatic amine derivatives to such grassy crops. It has also been found that the specific phenylenediamines of this invention are much less volatile than many other substituted aromatic amines and will move better in the soil, as well as possessing better ultraviolet stability.

The compounds can be applied as both a pre-emergence or a post-emergence treatment; that is they can be applied to soil in which the weeds will grow or they can be used to kill or suppress the growth of weeds or to kill or prevent the emergence of seedlings of undesirable plants. Thus, the compounds can be used to control the growth of weeds by applying a phytotoxic amount of one or more of the active compounds of this invention to the locus to be protected, that is, soil in which the weeds are growing or will grow or the foliage of the growing plants. "Weeds" as used herein is meant to include any plant growth which is undesirable.

Generally an application rate of from about 0.1 to about 25 pounds of one or more of the active compounds per acre is effective in controlling plant growth. Preferably an application rate of from about 0.5 to about 5 pounds per acre is employed. At such rates the undesirable weeds are killed or stunted with little or no injury to desirable crops.

The following examples illustrate the herbicidal activity of typical compounds of this invention.

EXAMPLE XV

The compounds to be tested were evaluated as pre-emergence herbicides on a broad class of representative weeds and crops. Greenhouse flats were planted to pigweed, cheat, wild oats, foxtail, morning glory, water grass, rice, sugar beets, cotton, corn, barley, and soy beans. On the same day of planting, the flats were sprayed with an ethanol solution of the compound to be tested at a rate of one pound per acre. The flats were kept in the greenhouse and watered when needed. 22 days after treatment, the plants were evaluated for herbicidal activity and rated on a 0 to 9 scale in which 0 = no effect; 5 = substantial injury with slight kill and 9 = complete kill. The following results were obtained:

TABLE I

| Compound (NTP=4-nitro-6-trifluoromethyl-1,3-phenylenediamine) | P | CH | WO | F | M | W | R | SB | CO | CR | B | SO |
|---|---|---|---|---|---|---|---|---|---|---|---|---|
| $N^1$-ethyl-$N^3$-sec-butyl-NTP | 4 | 2 | 9 | 9 | 0 | 7 | 0 | 3 | 0 | 2 | 0 | 0 |
| $N^1$-n-propyl-$N^3$-sec-butyl-NTP | 8 | 0 | 9 | 9 | 0 | 7 | 0 | 2 | 0 | 4 | 1 | 0 |
| $N^1$,$N^1$-dimethyl-$N^3$-sec-butyl-NTP | 4 | 2 | 9 | 9 | 6 | 7 | 0 | 4 | 0 | 7 | 1 | 0 |
| $N^1$,$N^3$-di-sec-butyl-NTP | 2 | 0 | 6 | 7 | 0 | 5 | 0 | 0 | 0 | 0 | 0 | 0 |
| $N^1$,$N^1$-dimethyl-$N^3$,$N^3$-diethyl-NTP | 8 | 3 | 9 | 9 | 1 | 5 | 0 | 4 | 0 | 4 | 0 | 0 |
| $N^1$-n-propyl-$N^3$,$N^3$-diethyl-NTP | 4 | 0 | 1 | 4 | 2 | 5 | 0 | 3 | 0 | 4 | 0 | 0 |
| $N^1$-allyl-$N^3$,$N^3$-diethyl-NTP | 6 | 1 | 9 | 8 | 1 | 8 | 0 | 3 | 0 | 0 | 0 | 0 |
| $N^1$-ethyl-$N^3$,$N^3$-di(2-methoxyethyl)-NTP | 2 | 0 | 5 | 4 | 0 | 4 | 0 | 0 | 0 | 0 | 0 | 0 |
| $N^1$-ethyl-$N^3$,$N^3$-tetramethylene-NTP | 4 | 1 | 1 | 8 | 0 | 4 | 0 | 1 | 0 | 0 | 0 | 0 |
| $N^1$-sec-butyl-$N^3$-ethyl-NTP | 4 | 1 | 5 | 8 | 1 | 7 | 0 | 3 | 0 | 3 | 0 | 0 |
| $N^1$-methyl-$N^3$-ethyl-NTP | 6 | 3 | 5 | 9 | 0 | 8 | 0 | 4 | 1 | 4 | 0 | 0 |
| $N^1$-methyl-$N^3$-isopropyl-NTP | 4 | 0 | 5 | 8 | 0 | 4 | 0 | 1 | 0 | 2 | 0 | 0 |
| $N^1$,$N^1$-dimethyl-$N^3$-n-propyl-NTP | 7 | 3 | 3 | 9 | 0 | 6 | 0 | 5 | 0 | 4 | 0 | 0 |
| $N^1$-n-propyl-$N^3$-ethyl NTP | 4 | 1 | 6 | 9 | 0 | 4 | 0 | 1 | 0 | 4 | 0 | 0 |
| $N^1$-n-propyl-$N^3$,$N^3$-di-n-propyl-NTP | 4 | 2 | 5 | 9 | 3 | 8 | 0 | 0 | 1 | 4 | 0 | 0 |

*P=pigweed, CH=cheat, WO=wild oats, F=foxtail, M=morning glory, W=water grass, R=rice, SB=sugar beets, CO=cotton, CR=corn, B=barley, SO=soy beans.

EXAMPLE XVI

The compounds to be tested were evaluated as both a pre-emergence and post-emergence treatment on a broad class of weeds and crops. Greenhouse flats were planted to the species tested in Example XV and the flats sprayed on the same day of planting with an ethanol solution of the compound to be tested at a rate of 2 pounds per acre.

Another set of flats with the same plants was treated after the plants had emerged and were about 1 inch in height. These flats were also sprayed with an ethanol solution of the compound at a rate of 2 pounds per acre in order to determine post-emergence activity. The flats were kept in the greenhouse and watered when needed. 22 days after treatment, the flats were evaluated and rated as described in Example XV. The following results were obtained:

TABLE II

| Plant species | Compound A | | Compound B | | Compound C | |
|---|---|---|---|---|---|---|
| | Pre | Post | Pre | Post | Pre | Post |
| Pigweed | 5 | 4 | 7 | 4 | 9 | 6 |
| Cheat | 2 | 0 | 3 | 0 | 8 | 1 |
| Wild oats | 9 | 3 | 9 | 3 | 9 | 3 |
| Foxtail | 9 | 3 | 9 | 5 | 9 | 4 |
| Morning glory | 4 | 4 | 4 | 3 | 9 | 3 |
| Water grass | 9 | 5 | 8 | 7 | 9 | 8 |
| Rice | 0 | 1 | 0 | 0 | 3 | 0 |
| Sugar beets | 4 | 4 | 3 | 5 | 6 | 6 |
| Cotton | 0 | 3 | 0 | 2 | 0 | 2 |
| Corn | 4 | 2 | 4 | 3 | 9 | 7 |
| Barley | 0 | 0 | 0 | 1 | 0 | 0 |
| Soy bean | 0 | 0 | 0 | 0 | 2 | 0 |

Compound A = $N^1$-methyl-$N^3$,$N^3$-di-n-propyl-4-nitro-6-trifluoromethyl-1,3-phenylenediamine Compound B = $N^1$-methyl-$N^3$-sec-butyl-4-nitro-6-trifluoromethyl-1,3-phenylenediamine Compound C = $N^1$-methyl-$N^3$,$N^3$-diethyl-4-nitro-6-trifluoromethyl-1,3-phenylenediamine

EXAMPLE XVII

Greenhouse flats were planted to cheat, wild oats, foxtail, water grass, crabgrass, and millet. On the same day of planting the flats were sprayed with an ethanol-dioxane solution of the compound to be tested at a rate of 25 pounds per acre. The flats were kept in the greenhouse and watered as needed. 21 days after treatment the flats were evaluated and rated as described in Example XV. The following results were obtained:

TABLE III

| Compound (NTP=4-nitro-6-trifluoromethyl-1,3-phenylenediamine) | Activity* | | | | | |
|---|---|---|---|---|---|---|
| | CH | WO | F | W | CB | MI |
| $N^1$-ethyl-$N^3$,$N^3$-diethyleneoxy-NTP | 1 | 1 | 5 | 4 | 3 | 3 |
| $N^1$-ethyl-$N^3$-(2-methoxyethyl)-NTP | 0 | 0 | 2 | 2 | 4 | 0 |
| $N^1$-ethyl-$N^3$-n-octyl-NTP** | 1 | 1 | 5 | 4 | 4 | 1 |
| $N^1$-ethyl-$N^3$-benzyl-NTP | 1 | 3 | 2 | 4 | 3 | 1 |
| $N^1$,$N^3$-di(2-methoxyethyl)-NTP | 1 | 1 | 1 | 1 | 5 | 2 |
| $N^1$,$N^3$-dicyclohexyl-NTP | | | | | 4 | 1 |

*CH=cheat, WO=wild oats, F=foxtail, W=water grass, CB=crabgrass, MI=millet.
**Applied at 22 pounds per acre.

EXAMPLE XVIII $N^1$,$N^3$-Di(p-methoxyphenyl)-4-nitro-6-trifluoromethyl-1,3-phenylenediamine was applied as a pre-emergence treatment at a rate of 15 pounds per acre to crabgrass, mustard and cucumbers. 26 days after treatment the crabgrass showed substantial injury while the broad-leaf mustard and cucumbers showed no injury.

EXAMPLE XIX

Greenhouse flats were planted to millet, oats, soy beans, velvetleaf, sorghum, cheat, pigweed, water grass, crabgrass, foxtail, Johnson grass and ryegrass. On the same day as planting the flats were sprayed with an ethanol-dioxane solution of the compound to be tested at a rate of 5 pounds per acre. The flats were kept in the greenhouse and watered when needed. 21 days after treatment the flats were evaluated and the herbicidal activity rated as described in Example XV. The following results were obtained;

Since a relatively small amount of one or more of the active 1,3-phenylenediamines should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, Bentonite, calcium chloride, vermiculite, calcium carbonate, and the like. Alternatively, the compounds can be dissolved or suspended in a liquid carrier such as water, kerosene, alcohols, diesel oil, xylen, benzene, glycols, ketones, and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkylarylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylenesorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them

TABLE IV

| Compound (NTP=4-nitro-6-trifluoromethyl-1,3-phenylenediamine) | Activity* | | | | | | | | | | |
|---|---|---|---|---|---|---|---|---|---|---|---|
| | MI | O | SO | V | SG | CH | P | W | CB | F | JG | RY |
| $N^1$-ethyl-$N^3$,$N^3$-di(2-methoxyethyl)-NTP | 9 | 4 | 0 | 0 | 4 | 1 | 9 | 9 | 9 | 9 | 9 | 8 |
| $N^1$-ethyl-$N^3$,$N^3$-diethyleneoxy-NTP | 3 | 0 | 0 | 0 | 0 | 0 | 1 | 3 | 0 | 3 | 2 | 0 |
| $N^1$-ethyl-$N^3$-(2-chloroallyl)-NTP | 9 | 3 | 0 | 0 | 4 | 0 | 8 | 7 | 9 | 8 | 8 | 3 |

*MI=millet, O=oats, SO=soy beans, V=velvetleaf, SG=sorghum, CH=cheat, P=pigweed, W=water grass, CB=crabgrass, F=foxtail, JG=Johnson grass, RY=ryegrass.

EXAMPLE XX

Greenhouse flats were planted to pigweed, crabgrass, wild oats, giant foxtail, sorghum, water grass, rice, Johnson grass, cotton, corn, barley and soy beans. On the same day as planting, the flats were sprayed with an ethanol solution of the compound to be tested at a rate of 1 pound per acre. The flats were kept in the greenhouse and watered when needed. 19 days after treatment the flats were evaluated and the herbicidal activity rated as described in Example XV. The following results were obtained:

with a locally available carrier, preferably water, thereby keeping shipping costs to a minimum while providing a product which can be used with a minimum of equipment and effort. Such concentrates may contain from about 5 to about 99 percent by weight of one or more of the active 1,3-phenylenediamines with a carrier or diluent, which may be a solid or liquid. Liquid carriers which are miscible with the active agent or other liquids in which the compound may be suspended or dispersed can be used. A surfactant is also generally included to facilitate such dilution or dispersion in water. However, the surfactant itself may comprise the

TABLE V

| Compound (NTP=4-nitro-6-trifluoromethyl-1,3-phenylendiamine) | Activity* | | | | | | | | | | |
|---|---|---|---|---|---|---|---|---|---|---|---|
| | P | CB | WO | F | SG | W | R | JG | CO | CR | B | SO |
| $N^1$,$N^3$-diethyl-NTP | 7 | 9 | 3 | 9 | 4 | 8 | 0 | 8 | 0 | 0 | 0 | 1 |
| $N^1$,$N^3$-diisopropyl-NTP | 1 | 3 | 1 | 5 | 0 | 3 | 0 | 4 | 0 | 0 | 0 | 0 |
| $N^1$,$N^3$-diallyl-NTP | 3 | 7 | 4 | 8 | 3 | 8 | 0 | 6 | 0 | 0 | 0 | 0 |
| $N^1$,$N^3$-dicyclopropyl-NTP | 0 | 6 | 0 | 6 | 0 | 2 | 0 | 3 | 0 | 0 | 0 | 0 |
| $N^1$,$N^3$-di-n-propyl-NTP | 7 | 8 | 3 | 8 | 4 | 6 | 0 | 5 | 0 | 0 | 0 | 0 |
| $N^1$-ethyl-$N^3$-allyl-NTP | 5 | 8 | 2 | 8 | 2 | 7 | 0 | 6 | 0 | 0 | 1 | 0 |
| $N^1$-ethyl-$N^3$,$N^3$-diethyl-NTP | 8 | 8 | 8 | 8 | 4 | 8 | 0 | 8 | 1 | 1 | 0 | 2 |
| $N^1$-ethyl-$N^3$,$N^3$-di-n-propyl-NTP | 7 | 8 | 8 | 8 | 4 | 8 | 0 | 8 | 0 | 0 | 0 | 0 |
| $N^1$-ethyl-$N^3$-phenyl-NTP | 0 | 5 | 5 | 4 | 0 | 2 | 0 | 2 | 0 | 0 | 0 | 1 |

*P=pigweed, CB=crabgrass, WO=wild oats, F=foxtail, SG=sorghum, W=water grass, R=rice, JG=Johnson grass, CO=cotton, CR=corn, B=barley, SO=soy bean.

carrier in such concentrates.

The herbicidal compositions can include other beneficial adjuvants, such as humectants, oils and contact agents. Also other herbicides, such as the sodium borates, sodium chlorate, chlorophenoxyacetic acids, substituted uracils and ureas, carbamates, amides, and haloalkanoic acids, can be included in the formulation.

The following examples are presented to illustrate the prepartion of suitable herbicidal compositions of this invention.

EXAMPLE XXI

5% N$^1$,N$^3$-diethyl-4-nitro-6-trifluoromethyl-1,3-phenylenediamine (powdered)
95% Granular clay A granular formulation can be prepared by dry blending the above constituents until uniformly mixed in a rotary mixer. A fine spray of water is sprayed onto the mixture, while tumbling, to adhere the compound to the clay. The material is then air dried while tumbling to give a granular formulation which can be applied to the soil or vegetation by hand or by a mechanical spreader.

EXAMPLE XXII

85% N$^1$-methyl-N$^3$,N$^3$-di-n-propyl-4-nitro-6-trifluoromethyl-1,3-phenylenediamine
14% Bentonite clay
1% Sodium lauryl sulfate surfactant A wettable powder formulation can be prepared by micronizing the 1,3-phenylenediamine and mixing uniformly with powdered Bentonite clay and powdered sodium lauryl sulfate. The wettable powder can be added to water or hydrocarbon oil and mechanically agitated to insure a uniform dispersion which can be sprayed with conventional equipment onto soil or vegetation.

EXAMPLE XXIII

25% N$^1$-methyl-N$^3$-sec-butyl-4-nitro-6-trifluoromethyl-1,3-phenylenediamine
5% Aromatic sulfonate surfactant
14% Chlorobenzene
56% Methyl isobutyl ketone The 1,3-phenylenediamine is dissolved in a mixture of chlorobenzene and the ketone to form a concentrated solution. The emulsifying agent is then dissolved and a liquid formulation of an emulsifiable concentrate is obtained. The emulsifiable concentrate can be added to water to dilute it to a desired concentration, and then sprayed with conventional equipment onto soil or vegetation.

Various changes and modifications of the invention can be made and, to the extent that such variations incorporate the spirit of this invention, they are intended to be included within the scope of the appended claims.

What is claimed is:

1. A compound of the formula

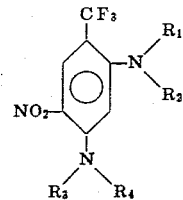

where $R_1$ and $R_3$ are each selected from hydrogen, lower alkyl, lower cycloalkyl, lower alkenyl, lower cycloalkenyl, lower alkynyl, and monocyclic aryl, and $R_2$ and $R_4$ are each selected from lower alkyl, lower cycloalkyl, lower alkenyl, lower cycloalkenyl, lower alkynyl, and monocyclic aryl, said lower alkyl, lower cycloalkyl, lower alkenyl, lower cycloalkenyl and lower alkynyl groups having 0–2 halo, nitro, hydroxy or lower alkoxy substituents, and said monocyclic aryl group having 0–2 halo, nitro, lower alkyl or lower alkoxy substituents.

2. A compound according to claim 1 in which $R_1$ and $R_3$ are each selected from hydrogen, alkyl of one to five carbon atoms, alkenyl of three to five carbon atoms and the halo-substituted derivatives thereof, and $R_2$ and $R_4$ are each selected from alkyl of one to five carbon atoms, alkenyl of three to five carbon atoms, and the halo-substituted derivatives thereof.

3. A compound according to claim 2 in which the total number of carbon atoms represented by $R_1 + R_2$ is one to four and the total number of carbon atoms represented by $R_3 + R_4$ is two to six.

4. N$^1$-methyl-N$^3$,N$^3$-di-n-propyl-4-nitro-6-trifluoromethyl-1,3-phenylenediamine.

5. N$^1$-methyl-N$^3$-sec-butyl-4-nitro-6-trifluoromethyl-1,3-phenylenediamine.

6. N$^1$-methyl-N$^3$,N$^3$-diethyl-4-nitro-6-trifluoromethyl-1,3-phenylenediamine.

7. N$^1$-allyl-N$^3$-ethyl-4-nitro-6-trifluoromethyl-1,3-phenylenediamine.

* * * * *